Patented Jan. 30, 1945

2,368,481

UNITED STATES PATENT OFFICE 2,368,481

PRODUCTION OF CALCIUM CHROMATE

Evan A. MacColl, Sault Ste. Marie, Ontario, Canada, assignor to Chromium Mining and Smelting Corpn., Limited, Sault Ste. Marie, Ontario, Canada, a corporation of Canada No Drawing. Application April 2, 1942,
Serial No. 437,363

2 Claims. (Cl. 23—56)

This invention relates to chromium recovery and has for an object the provision of an improved method or process for recovering chromium in the form of a valuable commercial compound of chromium from crude chromium-bearing material such, for example, as chromite ore and high-carbon ferrochromium. More particularly, the invention contemplates the provision of an improved method or process for recovering chromium in the form of relatively pure calcium chromate from crude chromium-bearing material. The invention further contemplates the provision of an improved method or process for producing calcium chromate.

Calcium chromate is a desirable reagent for use in many industries, but it is not widely used because its cost of production when produced according to heretofore customary methods or processes is excessive. The present invention provides an economical and efficient method of producing calcium chromate.

The invention is based on my discovery that calcium chromate may be produced readily by reacting sodium chromate with calcium nitrate. I have found that calcium nitrate and sodium chromate in water solution react rapidly and completely to produce solid calcium chromate and an aqueous solution of sodium nitrate when the solution is heated. Calcium chromate is formed and precipitated readily when a concentrated solution containing sodium chromate and calcium nitrate is heated to a boiling temperature under atmospheric pressure. The precipitate formed when the solution is heated or boiled under atmospheric pressure may comprise one or more hydrated forms of calcium chromate. Anhydrous calcium chromate may be formed by heating the solution under pressure to a temperature in excess of about 180° C. (equivalent to a pressure of about 150 pounds per square inch).

In a preferred method or process of the invention, the calcium nitrate and sodium chromate are dissolved separately in water to form separate solutions of calcium nitrate and sodium chromate, and the two solutions are mixed to form an aqueous solution containing both calcium nitrate and sodium chromate. The solution containing sodium chromate and calcium nitrate is then heated to effect precipitation of calcium chromate.

Solutions of sodium chromate and calcium nitrate of any suitable concentrations may be employed. Precipitation of calcium chromate is more effective and more complete when concentrated solutions are employed. Highly concentrated solutions may be employed most effectively. Mixing may be effected at the maximum temperatures of precipitation or at lower temperatures.

As indicated above, the heat treatment results in the production of an aqueous solution of sodium nitrate and a solid precipitate consisting essentially of calcium chromate. The calcium chromate precipitate and the solution of sodium nitrate may be separated by filtering or by sedimentation and decantation. The calcium chromate precipitate may be freed of adhering liquid by centrifuging.

The solution containing sodium nitrate may be treated in any suitable manner for the recovery or utilization of the sodium nitrate contained therein. According to a complete preferred process of the invention, the sodium nitrate formed in the production of calcium chromate is utilized for the production of additional sodium chromate.

In a complete preferred process of the invention, sodium chromate may be produced by roasting or oxidizing in air a finely divided and intimately mixed charge comprising lime (CaO) as such or in the form of limestone ($CaCO_3$), a chromium-bearing material such as chromite ore or high-carbon ferrochromium and sodium nitrate (or a decomposition product of sodium nitrate containing the sodium oxide of the sodium nitrate). The components of the charge preferably are in the form of particles sufficiently small to pass a 100-mesh screen, and oxidation preferably is carried out at a temperature in the range 1000° C. to 1200° C. The sodium oxide-bearing material preferably is employed in amount sufficient to form sodium chromate with all of the chromium present in the charge. Lime is employed as a diluent in amount sufficient to maintain the charge sufficiently porous to permit effective oxidation. The oxidation or roasting treatment results in oxidation of the chromium of the charge from the elemental state or the trivalent state with the production of chromium trioxide which combines with the sodium oxide to form sodium chromate. The oxidized product of the roasting treatment is subjected to a leaching treatment with an aqueous liquid in accordance with known procedures to produce an aqueous solution of sodium chromate.

Sodium chromate solution thus obtained is mixed, after concentration if necessary, with a solution of calcium nitrate, and the resulting mixture is heated to effect the precipitation of calcium chromate. The mixed solution preferably is heated under pressure to a temperature in excess of about 180° C. to effect the precipitation of anhydrous calcium chromate and the production of a solution of sodium nitrate.

The precipitated calcium chromate is separated from the sodium nitrate solution and it may be washed or dried or both in any suitable manner.

The sodium nitrate produced preferably is utilized in the oxidation treatment of additional crude chromium-bearing material to produce additional sodium chromate. The sodium nitrate may be utilized (1) by wetting an oxidation charge material with the solution, (2) by evaporating the solution to dryness and incorporating the resulting solid sodium nitrate in an oxidation charge, or (3) by treating the sodium nitrate to recover its oxide of nitrogen content and incorporating the residual sodium oxide content in an oxidation charge.

I claim:

1. The method of producing anhydrous calcium chromate which comprises forming an aqueous solution comprising calcium nitrate and sodium chromate, and heating the resulting solution under pressure to a temperature higher than about 180° C. and under conditions ensuring the crystallization of anhydrous calcium chromate.

2. The method of producing anhydrous calcium chromate which comprises subjecting a charge comprising chromium-bearing material, lime and sodium oxide-bearing material to an oxidizing treatment to form a product containing sodium chromate, subjecting the product of the oxidizing treatment to a leaching treatment and forming an aqueous solution of sodium chromate, subjecting the solution of sodium chromate to the action of calcium nitrate at an elevated temperature above about 180° C. under superatmospheric pressure and under conditions ensuring the crystallization of anhydrous calcium chromate to form solid calcium chromate and an aqueous solution of sodium nitrate, separating the sodium nitrate and the calcium chromate, and utilizing the sodium oxide content of the sodium nitrate in an oxidizing treatment of chromium-bearing material to produce additional sodium chromate.

EVAN A. MacCOLL.